United States Patent
Hamlin

(10) Patent No.: US 7,215,771 B1
(45) Date of Patent: May 8, 2007

(54) SECURE DISK DRIVE COMPRISING A SECURE DRIVE KEY AND A DRIVE ID FOR IMPLEMENTING SECURE COMMUNICATION OVER A PUBLIC NETWORK

(75) Inventor: Christopher L. Hamlin, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 725 days.

(21) Appl. No.: 09/608,103

(22) Filed: Jun. 30, 2000

(51) Int. Cl.
*H04L 9/00* (2006.01)

(52) U.S. Cl. .................... 380/44; 726/26; 726/34; 713/168; 713/189; 713/194

(58) Field of Classification Search .............. 713/201, 713/155, 200, 153, 176, 189; 380/4, 44, 380/285, 283, 264
See application file for complete search history.

(56) References Cited

U.S. PATENT DOCUMENTS

| 4,757,534 A | 7/1988 | Matyas et al. |
| 5,235,641 A | 8/1993 | Nozawa et al. |
| 5,463,690 A | 10/1995 | Crandall |
| 5,465,183 A | 11/1995 | Hattori |

(Continued)

FOREIGN PATENT DOCUMENTS

EP    0816967 A2    1/1998

(Continued)

OTHER PUBLICATIONS

William Stallings, "Cryptography and Network Security, Principles and Practice", Second Edition, Prentice Hall, Inc. ISBN 0-13-869017-0, pp. 323-353, Jul. 1998.*

(Continued)

*Primary Examiner*—Nasser Moazzami
*Assistant Examiner*—Carl Colin
(74) *Attorney, Agent, or Firm*—Howard H. Sheerin, Esq.

(57) ABSTRACT

A secure disk drive is disclosed comprising a disk for storing data, and an input for receiving an encrypted message from a client disk drive, the encrypted message comprising ciphertext data and a client drive ID identifying the client disk drive. The secure disk drive comprises a secure drive key and an internal drive ID. A key generator within the secure disk drive generates a client drive key based on the client drive ID and the secure drive key, and an internal drive key based on the internal drive ID and the secure drive key. The secure disk drive further comprises an authenticator for verifying the authenticity of the encrypted message and generating an enable signal, the authenticator is responsive to the encrypted message and the client drive key. The secure disk drive further comprises a data processor comprising a message input for receiving the encrypted message from the client disk drive, and a data output for outputting the ciphertext data to be written to the disk. The data processor further comprises an enable input for receiving the enable signal for enabling the data processor, and a key input for receiving the internal drive key, the internal drive key for use in generating a message authentication code. The data processor outputs reply data comprising the message authentication code. The secure disk drive outputs a reply to the client disk drive, the reply comprising the reply data and the internal drive ID.

16 Claims, 3 Drawing Sheets

U.S. PATENT DOCUMENTS

| | | | |
|---|---|---|---|
| 5,583,712 | A | 12/1996 | Brunelle |
| 5,592,555 | A | 1/1997 | Stewart |
| 5,657,470 | A | 8/1997 | Fisherman et al. |
| 5,677,952 | A | 10/1997 | Blakley, III et al. |
| 5,687,237 | A | 11/1997 | Naclerio |
| 5,805,699 | A * | 9/1998 | Akiyama et al. ............. 705/58 |
| 5,883,958 | A | 3/1999 | Ishiguro |
| 5,915,018 | A | 6/1999 | Aucsmith |
| 5,923,754 | A | 7/1999 | Angelo et al. |
| 5,930,358 | A | 7/1999 | Rao |
| 5,931,947 | A * | 8/1999 | Burns et al. ................ 713/201 |
| 5,995,624 | A | 11/1999 | Fielder et al. |
| 6,061,794 | A | 5/2000 | Angelo et al. |
| 6,064,989 | A | 5/2000 | Cordery et al. |
| 6,085,320 | A | 7/2000 | Kaliski, Jr. |
| 6,144,743 | A | 11/2000 | Yamada et al. |
| 6,189,098 | B1 | 2/2001 | Kaliski, Jr. |
| 6,226,750 | B1 * | 5/2001 | Trieger ....................... 713/201 |
| 6,230,269 | B1 * | 5/2001 | Spies et al. ................. 713/182 |
| 6,253,323 | B1 | 6/2001 | Cox et al. |
| 6,289,102 | B1 | 9/2001 | Ueda et al. |
| 6,289,451 | B1 | 9/2001 | Dice |
| 6,289,457 | B1 | 9/2001 | Bishop et al. |
| 6,363,487 | B1 | 3/2002 | Schneider |
| 6,397,333 | B1 * | 5/2002 | Sohne et al. ................ 713/176 |
| 6,405,315 | B1 | 6/2002 | Burns et al. |
| 6,434,700 | B1 | 8/2002 | Alonso et al. |
| 6,438,235 | B2 * | 8/2002 | Sims .......................... 380/285 |
| 6,473,809 | B1 | 10/2002 | Aref et al. |
| 6,473,861 | B1 * | 10/2002 | Stokes ........................ 713/193 |
| 6,550,009 | B1 | 4/2003 | Uranaka et al. |
| 6,609,199 | B1 | 8/2003 | DeTreville |
| 6,615,264 | B1 | 9/2003 | Stoltz et al. |
| 6,823,398 | B1 | 11/2004 | Lee et al. |
| 2001/0032088 | A1 * | 10/2001 | Utsumi et al. ................. 705/1 |
| 2003/0191816 | A1 | 10/2003 | Landress et al. |

FOREIGN PATENT DOCUMENTS

| | | |
|---|---|---|
| EP | 0911738 A2 | 4/1998 |

OTHER PUBLICATIONS

Menezes et al., "Handbook of Applied Cryptography", 1997, CRC Press, p. 171, 357-358.*

Menezes et al., "Handbook of Applied Cryptography", 1997, CRC Press, pp. 500-501.*

Bennet Yee, J.D. Tygar, "Secure Coprocessors in Electronic Commerce Applications", First USENIX Workshop on Electronic Commerce, Jul. 11-12, 1995, 155-170.

Howard Gobioff, "Security for a High Performance Commodity Storage Subsystem", School of Computer Science, Carnegie Mellon University, CMU-CS-99-160, Jul. 1999, pp. 171-178.

Rodney Van Meter, Steve Hotz, Gregory Finn, "Derived Virtual Devices: A Secure Distributed File System Mechanism", In Proceedings of the Fifth NASA Goddard Space Flight Center Conference on Mass Storage Systems and Technologies, Sep. 1996.

Garth A. Gibson, David F. Nagle, Khalil Amiri, Fay W. Chang, Howard Gobioff, Erik Riedel, David Rochberg, and Jim Zelenka, "Filesystems for Network-Attached Secure Disks", Jul. 1997, 1-18, CMU-CS-97-118, School of Computer Science, Carnegie Mellon University, Pittsburgh, Pennsylvania 15213-3890.

Howard Gobioff, Garth Gibson, and Doug Tygar, "Security for Network Attached Storage Devices", Oct. 23, 1997, 1-18, CMU-CS-97-185, School of Computer Science, Carnegie Mellon University, Pittsburgh, PA 15213.

"Digital Transmission License Agreement", www.dtcp.com.

"Digital Transmission Content Protection Specification", vol. 1, Revision 1.0, Apr. 12, 1999, www.dtcp.com.

"5C Digital Transmission Content Protection White Paper", Revision 1.0, Jul. 14, 1998, www.dtcp.com.

Steve Grossman, "Two-Chip Set Safeguards Digital Video Content", Electronic Design, Jun. 12, 2000, pp. 68-72.

William Stallings, "Cryptography and Network Security, Principles and Practice", Second Edition, Prentice Hall, Inc. ISBN 0-13-869017-0, pp. 323-353, Jul. 1998.

Microsoft, Computer Dictionary, 5th Edition, 2002, p. 165.

Bertino et al. "Advanced Transaction Processing in Multilevel Secure File Stores", 1998, IEEE 1041-4347/98.

Menezes et al., "Handbook of Applied Cryptography", 1997, CRC Press, p. 171, 357-358.

Menezes et al., "Handbook of Applied Cryptography", 1997, CRC Press, pp. 500-501.

Erik Ottem, "White Papers: Hold on to Your Memory: Password Protection for Disc Drive Security", http://www.seagate.com/nowsinfo/newsroom/papers/D2c9.html, pp. 1-3, Jun. 1996.

\* cited by examiner

SECURE DISK DRIVE COMPRISING A SECURE DRIVE KEY AND A DRIVE ID FOR IMPLEMENTING SECURE COMMUNICATION OVER A PUBLIC NETWORK

BACKGROUND OF THE INVENTION

1. Field of the Invention

The present invention relates to disk drives for computer systems. More particularly, the present invention relates to a secure disk drive comprising a secure drive key and a drive ID for implementing secure communication over a public network.

2. Description of the Prior Art

Security is of primary concern in network communications, particularly transactions taking place over the Internet. Highly sophisticated encryption algorithms have been employed to protect the integrity of sensitive data while in transit over public lines (transmission lines subject to inspection). The encryption algorithms are typically so reliable that it has become extremely difficult for an attacker to decipher a message that has been intercepted without access to the secret keys used to decrypt the message. Thus, attackers have focused their efforts on the destination or source computers and software involved in the transaction, either by attempting to intercept the message before encryption or after decryption, or by attempting to discover the secret keys used to decrypt the messages.

For example, an attacker may attempt to steal a disk drive from a network and then read the stored data at their leisure. Storing the data in encrypted form protects against this type of attack since the data cannot be deciphered even if the disk drive is stolen. This, however, does not protect against an attacker monitoring the encryption process as it takes place on a computer connected to the disk drive. Computers and the software running thereon are typically susceptible to various types of probing, such as with debuggers or logic analyzers, as well as virus programs which may allow access to otherwise protected information. For example, a virus program may be introduced into a computer's operating system by attaching the virus to an email.

A paper by H. Gobioff, G. Gibson, and D. Tygar entitled "Security for Network Attached Storage Devices", Oct. 23, 1997, School of Computer Science, Carnegie Mellon University, suggests to implement the cryptographic circuitry and secret keys in tamper resistant circuitry within a disk drive where it is less susceptible to probing and virus attacks. These types of disk drives, referred to as NASD disk drives, are intended to be attached directly to a network in order to avoid the overhead associated with an intervening file server.

An overview of the security aspects suggested for a NASD disk drive is shown in FIG. 1A. A NASD disk drive 2 implements cryptography to communicate securely with a client computer 4 over a public network. Secret keys are used to encrypt and decrypt messages passed between the NASD disk drive 2 and client computer 4 so that any message intercepted in transit cannot be deciphered. In addition, the secret keys are used to transmit message authentication codes (MACs) which are used to verify the authenticity of the received messages.

To access the NASD disk drive 2, the client computer 4 sends a request 8, together with certain capability arguments, over a secure, private interface (not subject to inspection) to a file manager computer 6. The file manager computer 6 generates a secret client key 10 based on a secret working key together with the capability arguments received from the client computer 4. The secret client key 10 is transferred to the client computer 4 over the secure interface. The client computer 4 constructs an encrypted message 12 together with a MAC using the secret client key 10, and the encrypted message 12, including the capability arguments, is transferred to the NASD disk drive 2 over a public interface. The NASD disk drive 2 uses the secret working key and the capability arguments received in the message in order to reconstruct the secret client key which is then used to decrypt the encrypted message 12 as well as verify its authentication using the MAC. The NASD disk drive 2 then uses the secret client key to construct an encrypted reply 14 (including a MAC) which is transferred to the client 4. The file manager computer 6 may send a command 16 to the NASD disk drive 2 in order to change the secret working key, thereby decommissioning all of the previously issued secret client keys.

The above referenced paper suggests to implement the encryption, decryption, and message authentication facilities within the NASD disk drive 2 using tamper resistant circuitry to provide protection against probing attackers. However, the key management facilities implemented by the file manager computer 6 are still susceptible to attack, including physical probing attacks as well as attacks using virus programs which manipulate the operating system in order to reveal protected information concerning the secret keys.

The Digital Transmission Content Specification or DTCP discloses a cryptographic protocol for protecting audio/video (A/V) content from unauthorized copying as it traverses digital transmission mechanisms from device to device. Only compliant devices manufactured to support the DTCP protocol are capable of transmitting or receiving the protected A/V content. Each device is manufactured with a unique device ID and a public/private key pair which facilitate authentication and encryption/decryption of the A/V content. When a source device receives a request to transmit protected A/V content to a sink device, the source and sink devices engage in an authentication transaction. If the authentication transaction is successful, the source device generates an exchange key which is communicated to the sink device. The exchange key is used by the sink device to generate a content key associated with each A/V stream which is used to decrypt the A/V stream.

A problem with the DTCP protocol is that the A/V content is decrypted as it is received by the sink device and then stored on a storage medium in plaintext form. When the content is transferred to another device, the plaintext data is recovered from the storage medium, re-encrypted, transmitted, and again decrypted by the sink device for storage in plaintext form. Thus, the A/V content is only encrypted during transmission, which renders it susceptible to discovery by an attacker probing the devices. For example, an attacker may monitor the encryption or decryption process as they execute on a device, or an attacker may evaluate the storage medium in order to recover the A/V content in its plaintext form.

U.S. Pat. No. 5,931,947 discloses a network storage device for use in a secure array of such devices to support a distributed file system. Each device is an independent repository of remotely encrypted data to be accessed by authorized network clients. All encryption is done by the clients, rather than by the devices, and the encrypted data is stored in encrypted form. Each network storage device comprises an owner key used to generate authentication keys within the device for authenticating messages received from the clients. However, the keys used by the clients for encrypting data and generating the message authentication codes are generated external to the devices by a system administrator which is susceptible to attack.

There is, therefore, the need to improve security in network communications, particularly with respect to probing attacks and virus attacks on computer operating systems.

SUMMARY OF THE INVENTION

The present invention may be regarded as a secure disk drive comprising a disk for storing data, and an input for receiving an encrypted message from a client disk drive, the encrypted message comprising ciphertext data and a client drive ID identifying the client disk drive. The secure disk drive comprises a secure drive key and an internal drive ID. A key generator within the secure disk drive generates a client drive key based on the client drive ID and the secure drive key, and an internal drive key based on the internal drive ID and the secure drive key. The secure disk drive further comprises an authenticator for verifying the authenticity of the encrypted message and generating an enable signal, the authenticator is responsive to the encrypted message and the client drive key. The secure disk drive further comprises a data processor comprising a message input for receiving the encrypted message from the client disk drive, and a data output for outputting the ciphertext data to be written to the disk. The data processor further comprises an enable input for receiving the enable signal for enabling the data processor, and a key input for receiving the internal drive key, the internal drive key for use in generating a message authentication code. The data processor outputs reply data comprising the message authentication code. The secure disk drive outputs a reply to the client disk drive, the reply comprising the reply data and the internal drive ID.

The present invention may also be regarded as a secure disk drive comprising a disk for storing data, and an input for receiving an encrypted message from a client disk drive, the encrypted message comprising ciphertext data and a client drive ID identifying the client disk drive. The secure disk drive comprises a secure drive key and an internal drive ID. A key generator within the secure disk drive generates a client drive key based on the client drive ID and the secure drive key, and an internal drive key based on the internal drive ID and the secure drive key. The secure disk drive further comprises an authenticator for verifying the authenticity of the encrypted message and generating an enable signal, the authenticator is responsive to the encrypted message and the client drive key. The secure disk drive further comprises a data processor comprising a message input for receiving the encrypted message from the client disk drive, and a data input for receiving encrypted data read from the disk. The data processor further comprises an enable input for receiving the enable signal for enabling the data processor, and a key input for receiving the internal drive key, the internal drive key for use in generating a message authentication code. The data processor outputs reply data comprising the encrypted data read from the disk and the message authentication code. The secure disk drive outputs a reply to the client disk drive, the reply comprising the reply data and the internal drive ID.

DESCRIPTION OF THE PREFERRED EMBODIMENTS

Figure 2:
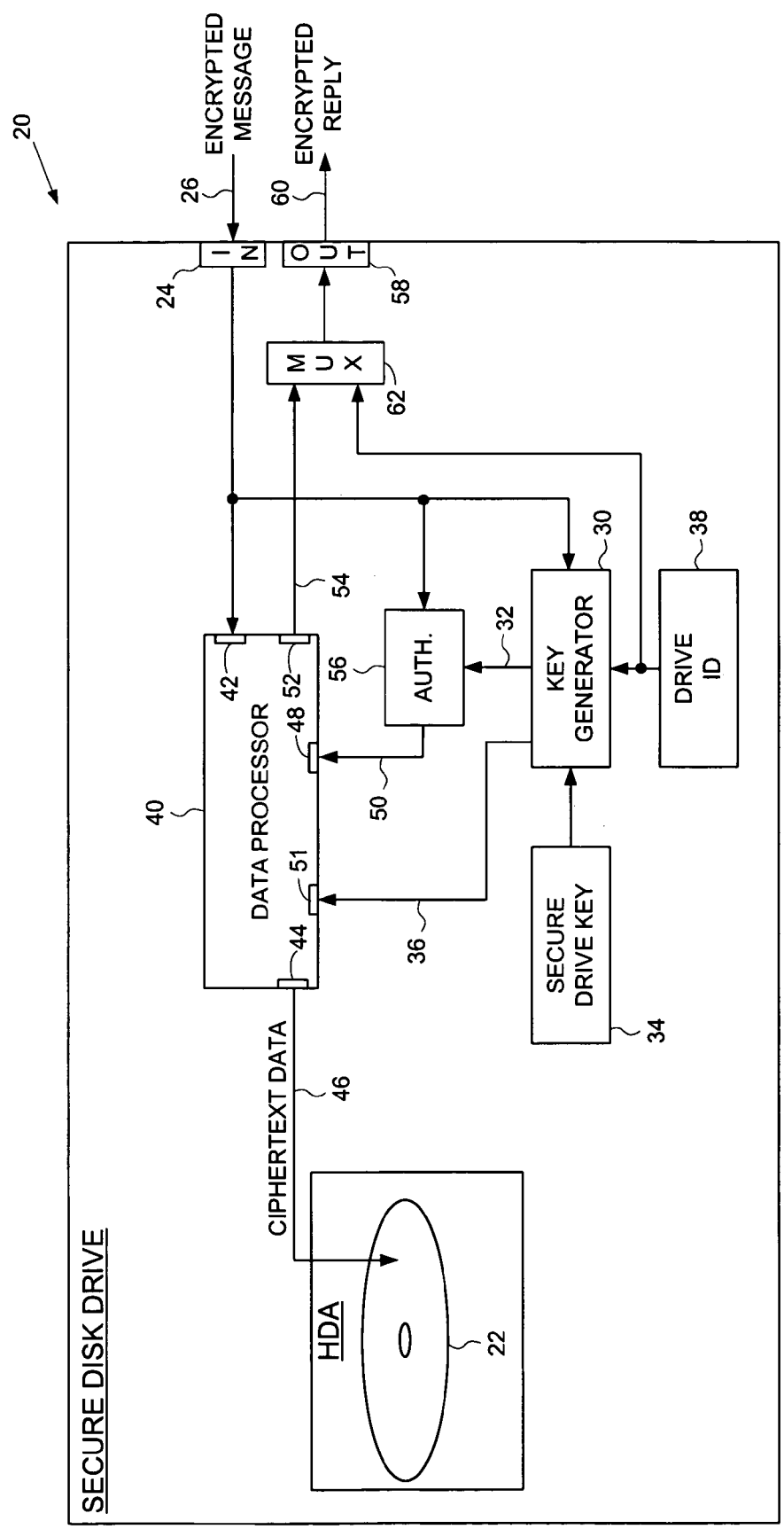
FIG. 2 shows a secure disk drive according to an embodiment of the present invention as comprising a data processor for processing encrypted messages received from client disk drives, an authenticator for authenticating the encrypted messages and enabling the data processor to write the ciphertext data in the encrypted message to the disk, and a secure drive key and a drive ID for generating keys which facilitate cryptographic facilities such as authentication, encryption and decryption.

FIG. 2 shows a secure disk drive 20 according to an embodiment of the present invention as comprising a disk 22 for storing data, and an input 24 for receiving an encrypted message 26 from a client disk drive, the encrypted message 26 comprising ciphertext data and a client drive ID identifying the client disk drive. The secure disk drive 20 comprises a secure drive key 34 and an internal drive ID 38. A key generator 30 within the secure disk drive 20 generates a client drive key 32 based on the client drive ID and the secure drive key 34, and an internal drive key 36 based on the internal drive ID 38 and the secure drive key 34. The secure disk drive 20 further comprises an authenticator 56 for verifying the authenticity of the encrypted message 26 and generating an enable signal 50, the authenticator 56 is responsive to the encrypted message 26 and the client drive key 32. The secure disk drive further comprises a data processor 40 comprising a message input 42 for receiving the encrypted message 26 from the client disk drive, and a data output 44 for outputting the ciphertext data 46 to be written to the disk 22. The data processor 40 further comprises an enable input 48 for receiving the enable signal 50 for enabling the data processor 40, and a key input 51 for receiving the internal drive key 36, the internal drive key 36 for use in generating a message authentication code. The data processor 40 outputs reply data 54 comprising the message authentication code. The secure disk drive 20 outputs a reply 60 to the client disk drive, the reply 60 comprising the reply data 54 and the internal drive ID 38.

Figure 1A:
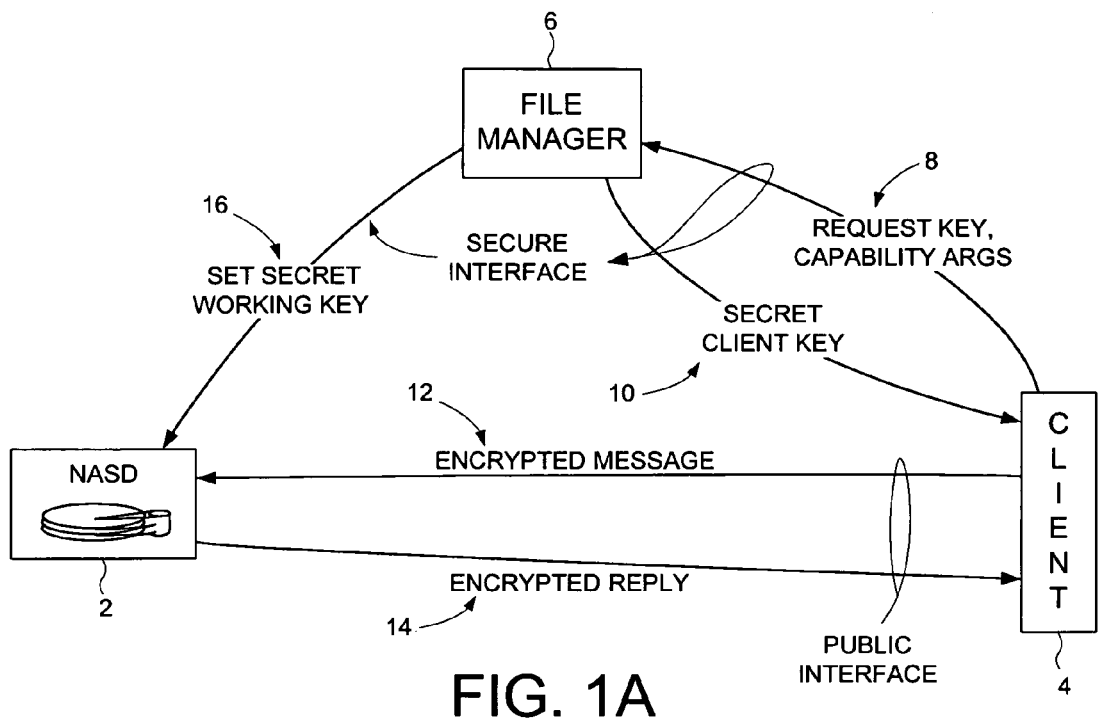
FIG. 1A shows an overview of a prior art network system wherein a file manager performs key management functions for a Network Attached Storage Device (NASD).
Figure 1B:
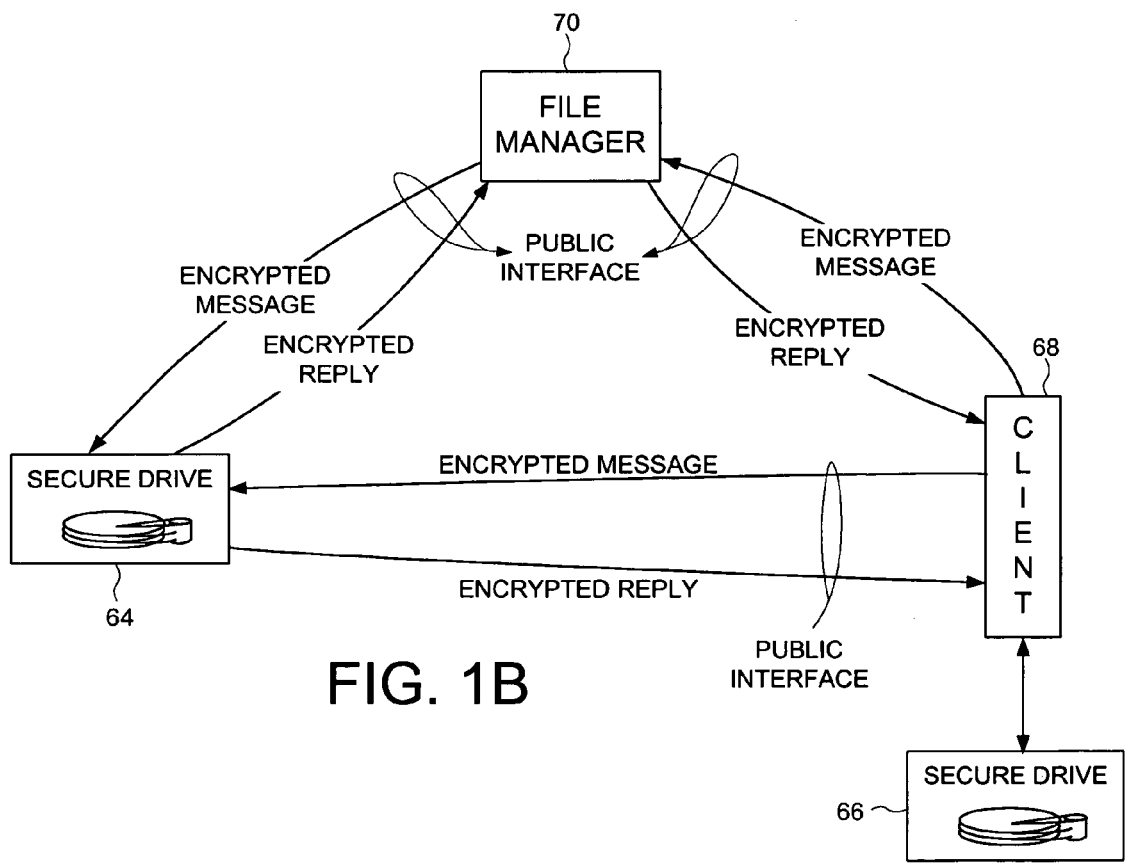
FIG. 1B shows an overview of a computer network comprising a plurality of secure disk drives according to an embodiment of the present invention, wherein the secure disk drives implement key management and cryptographic functions for secure communication over the computer network, and the ciphertext data in the encrypted messages is not decrypted until presented to a trusted authority, such as a trusted client.

FIG. 1B shows a computer network comprised of secure disk drives 64 and 66 which are manufactured to support the secure communication facilities according to the embodiments of the present invention. Secure disk drive 64 comprises network communication circuitry for connecting directly to the network similar to the conventional NASD disk drive 2 of FIG. 1A, and secure disk drive 66 is connected to the network through a client computer 68. The network in the embodiment of FIG. 1B further comprises a network file manager 70 for implementing a distributed file system which may utilize secure disk drives manufactured according to the secure communication facilities of the present invention. The data transmitted between the secure disk drives, including initial messages and replies, are encrypted to facilitate message authentication and secrecy. The secure disk drives may be connected directly, or they may be connected through intermediary computers, such as client, router, or server computers. In one embodiment, intermediary computers, such as the network file manager 70 and client computer 68 of FIG. 1B, are intentionally isolated from the communication process so that the secure disk drives communicate autonomously. This embodiment protects against an attacker attempting to disrupt the network by infiltrating an intermediary computer and masquerading as a trusted authority in order to invoke a denial of service facility.

Communication between the secure disk drives involves transmitting encrypted messages between the drives and authenticating the message as they are received. In one embodiment, the secure disk drives comprise cryptographic facilities for encrypting the messages to be transmitted. For example, the secure disk drive 66 of FIG. 1B may receive plaintext data from the client computer 68 which is encrypted into ciphertext, optionally stored, and then transmitted to another secure disk drive (e.g., secure disk drive 64). When an encrypted message is received by a secure disk drive, it is not automatically decrypted as with the prior art DTCP protocol. Instead, the ciphertext in the encrypted message is processed (e.g., stored) in its encrypted form in order to maintain the mathematical protection of the encryption algorithm, thereby protecting against a probing attacker who may, for example, steal the disk drive and analyze the storage medium at leisure.

The embodiment of FIG. 2 illustrates a data transfer between two secure disk drives, wherein the secure disk drive 20 of FIG. 2 is receiving an encrypted message 26 from another secure disk drive referred to as a client disk drive. The encrypted message 26 comprises ciphertext data which is to be written to the disk 22. Before executing the write operation, however, the authenticator 56 within the secure disk drive 20 first authenticates the encrypted message 26 to verify that it has been received from a secure disk drive belonging to a trusted nexus of secure disk drives, and that the encrypted message 26 has not been tampered with during transmission. In one embodiment, the authenticator 56 also verifies the access rights associated with the encrypted message 26 received from the client disk drive. To facilitate the authentication process, each secure disk drive is manufactured with a unique drive ID 38 and a secure drive key 34. When an encrypted message is output from a secure disk drive, a message authentication code is generated using an internal drive key 36. The internal drive key 36 is generated by the key generator 30 based on the unique drive ID 38 and the secure drive key 34. The encrypted message 26 also contains the unique drive ID of the client disk drive so that the secure disk drive 20 receiving the encrypted message 26 can identify the client disk drive (the sender of the encrypted message 26).

The message authentication code may be implemented using any suitable technique. For example, in one embodiment the message authentication code is generated using well known hash message authentication codes or HMACs. In another embodiment, the encrypted message is self authenticating in that it can only be decrypted if it has been generated by a trusted authority and has not been modified during the transmission. In yet another embodiment, the authentication process involves a challenge and response sequence between the secure disk drives. The authenticator 56 of FIG. 2 comprises suitable means for implementing the authentication facility.

The client drive ID received in the encrypted message 26 may be encrypted, but it is ultimately presented to the key generator 30 in plaintext form. The key generator 30 generates a client drive key 32 based on the client drive ID and the secure drive key 34 of the receiving secure disk drive 20. The client drive key 32 may be symmetric or asymmetric depending on the design of the message authentication code. The authenticator 56 evaluates the client drive ID in the encrypted message 26 to verify that the client disk drive is part of the trusted nexus and has not been decommissioned. The authenticator 56 then uses the client drive key 32 to verify that the encrypted message 26 was in fact generated by the client disk drive which is associated with the client drive ID received in the encrypted message 26. In addition, the authenticator 56 may use the client drive key 32 to verify that the encrypted message 26 was not modified during the transmission. For example, if the message authentication code is generated using an HMAC over the entire encrypted message, then the corresponding HMAC generated by the authenticator 56 will not authenticate the message if the message is modified during the transmission or if the message is transmitted by an invalid entity.

If a received message fails to authenticate, it may indicate the secure disk drive that transmitted the message has been tampered with. In one embodiment, steps are taken to evaluate the integrity of the secure disk drive to determine if it has been compromised. For example, the file manager 70 of FIG. 1B or another secure disk drive may initiate a challenge and response verification sequence with the suspect secure disk drive. If the secure disk drive fails the challenge and response verification sequence, it is deemed compromised and is decommissioned. In an alternative embodiment, the secure disk drives are designed to detect internal tampering and will decommission themselves from the nexus when internal tampering is detected. The decommissioning function may be implemented by the file manager 70, or it may be distributed and handled autonomously by the nexus of secure disk drives. In one embodiment, a message is transmitted to the nexus of secure disk drives indicating that a compromised secure disk drive has been decommissioned.

If the authenticator 56 authenticates the encrypted message 26, then the secure disk drive 20 of FIG. 2 extracts the ciphertext data 46 from the encrypted message 26 and writes it to the disk 22. In one embodiment, the data processor 40 comprises error correction code (ECC) facilities for generating redundancy symbols appended to the ciphertext data 46 as it is written to the disk 22. The redundancy symbols are used during read-back to correct errors induced by the recording process.

After completing the write operation, the secure disk drive 20 of FIG. 2 generates an encrypted reply 60 transmitted to the client disk drive to confirm that the write operation was executed successfully. The key generator 30 generates an internal drive key 36 using the secure drive key 34 and the drive ID 38. The data processor 40 generates reply data 54 (indicating a successful write operation) and uses the internal drive key 36 to generate a message authentication code over the reply data. The reply data (including the message authentication code) together with the drive ID 38 are then transmitted to the client disk drive as the encrypted reply 60 via output 58. In the embodiment shown in FIG. 2, a multiplexer 62 first applies the reply data 54 to the output 58 and then applies the drive ID 38 to the output 58. The data processor 40 may also encrypt the reply data 54 before transmitting it to the client disk drive.

The key generator 30 comprises suitable facilities for generating the client drive key 32 and the internal drive key 36. For example, in one embodiment the key generator 30 generates the keys using well known hash functions, such as those disclosed in the MD5 Message Digest Algorithm. The secure drive key 34 may be mutable in order to reconfigure a nexus of secure disk drives, wherein the key generator 30 computes the internal drive key 36 dynamically each time it is needed by the data processor 40. In another embodiment, the secure drive key 34 is immutable and the internal drive key 36 is also static (i.e., computed one time and stored securely). In yet another embodiment, the secure drive key 34 is immutable but the internal drive key 36 is computed dynamically so that it is generated only if the secure disk drive 20 is operating correctly.

Figure 3:
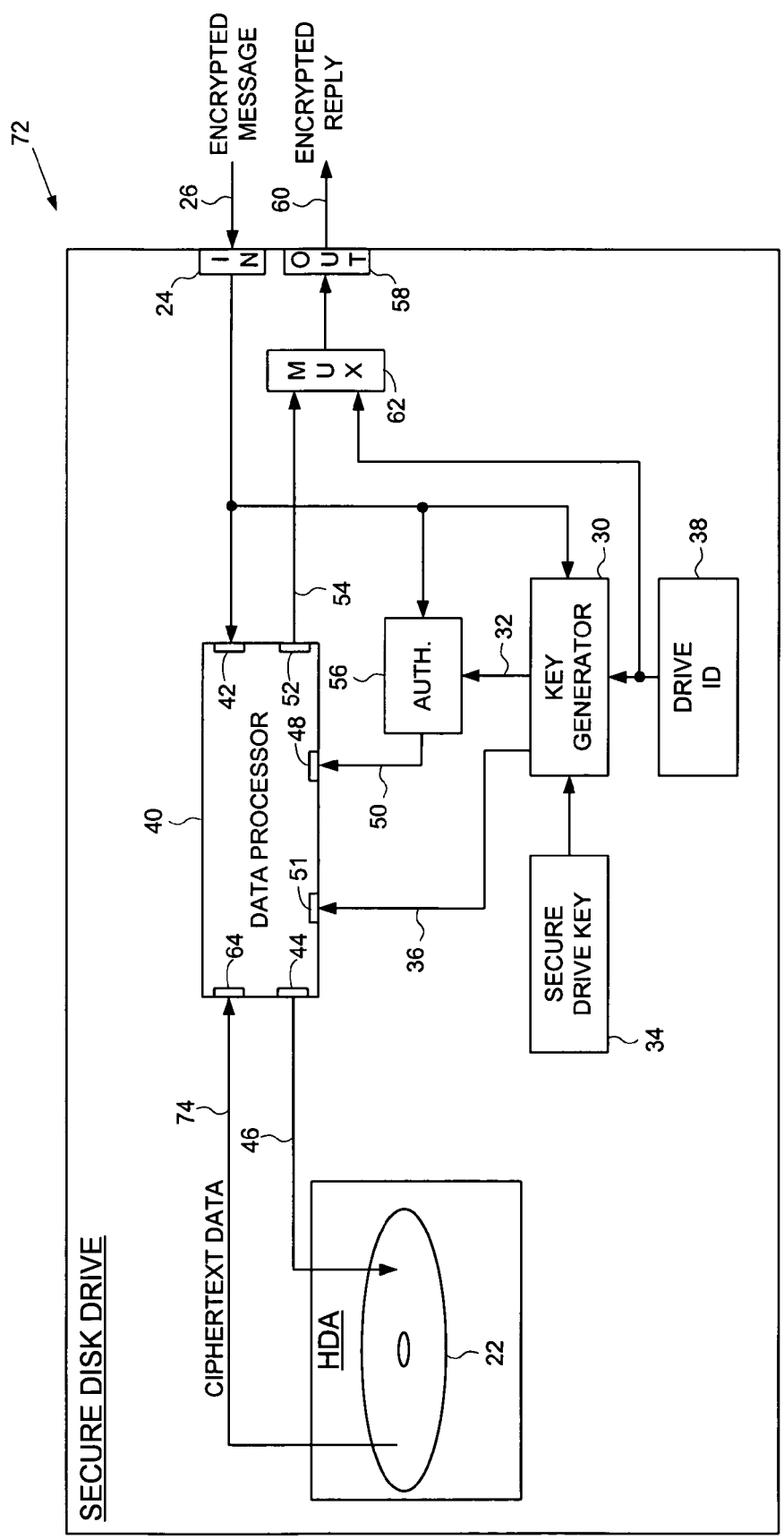
FIG. 3 shows a secure disk drive according to an embodiment of the present invention as comprising a data processor for processing encrypted messages received from client disk drives, an authenticator for authenticating the encrypted messages and enabling the data processor to read ciphertext data from the disk, and a secure drive key and a drive ID for generating keys which facilitate cryptographic facilities such as authentication, encryption and decryption.

FIG. 3 illustrates a secure disk drive 72 according to an embodiment of the present invention wherein the encrypted message 26 comprises a read request generated by the client disk drive. The data processor 40 comprises a message input 42 for receiving the encrypted message 26 from the client disk drive, and a data input 64 for receiving ciphertext data 74 read from the disk 22. The data processor 40 further comprises an enable input 48 for receiving the enable signal 50 for enabling the data processor 40, and a key input 51 for receiving the internal drive key 36, the internal drive key 36 for use in generating a message authentication code. The data processor 40 outputs reply data 54 comprising the ciphertext data 74 read from the disk 22 and the message authentication code. The secure disk drive 72 outputs an encrypted reply 60 to the client disk drive, the encrypted reply 60 comprising the reply data 54 and the internal drive ID 38. In one embodiment, the secure disk drive 72 further comprises cryptographic facilities for decrypting the ciphertext data 74 into plaintext data which is supplied to a trusted authority.

The components in the secure disk drive 20 shown in FIG. 2 may be implemented in integrated circuitry or in firmware executed by a microprocessor. In one embodiment, tamper-resistant circuitry is used to implement one or more of the components, such as the secure drive key 34, the key generator 30, and/or the authenticator 56, in order to protect against a probing attacker from deriving information about the secure drive key 34. An example discussion of tamper-resistant circuitry is provided in Tygar, J. D. and Yee, B. S., "Secure Coprocessors in Electronic Commerce Applications," Proceedings 1995 USENIX Electronic Commerce Workshop, 1995, New York, which is incorporated herein by reference. Further, implementing the key management, authentication and cryptographic facilities wholly within the secure disk drive autonomous from the operating system of a host computer renders the network less susceptible to virus attacks as compared to the file manager computer 6 in the prior art NASD implementation shown in FIG. 1A.

We claim:

1. A secure disk drive comprising:
   (a) a disk for storing data;
   (b) an input for receiving an encrypted message from a client disk drive, the encrypted message comprising ciphertext data and a client drive ID identifying the client disk drive;
   (c) a secure drive key;
   (d) an internal drive ID;
   (e) a key generator for generating a client drive key based on the client drive ID and the secure drive key, and an internal drive key based on the internal drive ID and the secure drive key;
   (f) an authenticator for verifying the authenticity of the encrypted message and generating an enable signal, the authenticator responsive to the encrypted message and the client drive key;
   (g) a data processor comprising:
       a message input for receiving the encrypted message from the client disk drive;
       a data output for outputting the ciphertext data to be written to the disk;
       an enable input for receiving the enable signal for enabling the data processor;
       a key input for receiving the internal drive key, the internal drive key for use in generating a message authentication code; and
       a reply output for outputting reply data, the reply data comprising the message authentication code; and
   (h) an output for outputting a reply to the client disk drive, the reply comprising the reply data and the internal drive ID.

2. The secure disk drive of claim 1, wherein the secure drive key is immutable.

3. The secure disk drive of claim 1, wherein the secure drive key is mutable.

4. The secure disk drive of claim 1, wherein the authenticator comprises a means for verifying the access rights of the client drive ID.

5. The secure disk drive of claim 1, wherein the secure drive key comprises tamper resistant circuitry.

6. The secure disk drive of claim 1, wherein the key generator comprises tamper resistant circuitry.

7. The secure disk drive as recited in claim 1, wherein the authenticator comprises tamper resistant circuitry.

8. The secure disk drive as recited in claim 1, wherein the data processor further comprises cryptographic facilities.

9. A secure disk drive comprising:
   (a) a disk for storing data;
   (b) an input for receiving an encrypted message from a client disk drive, the encrypted message comprising ciphertext data and a client drive ID identifying the client disk drive;
   (c) a secure drive key;
   (d) an internal drive ID;
   (e) a key generator for generating a client drive key based on the client drive ID and the secure drive key, and an internal drive key based on the internal drive ID and the secure drive key;
   (f) an authenticator for verifying the authenticity of the encrypted message and generating an enable signal, the authenticator responsive to the encrypted message and the client drive key;
   (g) a data processor comprising:
       a message input for receiving the encrypted message from the client secure disk drive;
       a data input for receiving ciphertext data read from the disk;
       an enable input for receiving the enable signal for enabling the data processor;
       a key input for receiving the internal drive key, the internal drive key for use in generating a message authentication code; and
       a reply output for outputting reply data, the reply data comprising the ciphertext data read from the disk and the message authentication code; and (h) an output for outputting a reply to the client disk drive, the reply comprising the reply data and the internal drive ID.

10. The secure disk drive of claim 9, wherein the secure drive key is immutable.

11. The secure disk drive of claim 9, wherein the secure drive key is mutable.

12. The secure disk drive of claim 9, wherein the authenticator comprises a means for verifying the access rights of the client drive ID.

13. The secure disk drive of claim 9, wherein the secure drive key comprises tamper resistant circuitry.

14. The secure disk drive of claim 9, wherein the key generator comprises tamper resistant circuitry.

15. The secure disk drive as recited in claim 9, wherein the authenticator comprises tamper resistant circuitry.

16. The secure disk drive as recited in claim 9, wherein the data processor further comprises cryptographic facilities.

* * * * *